(No Model.)
R. M. HUNTER.
ELECTRIC RAILWAY.
No. 385,672.   Patented July 3, 1888.
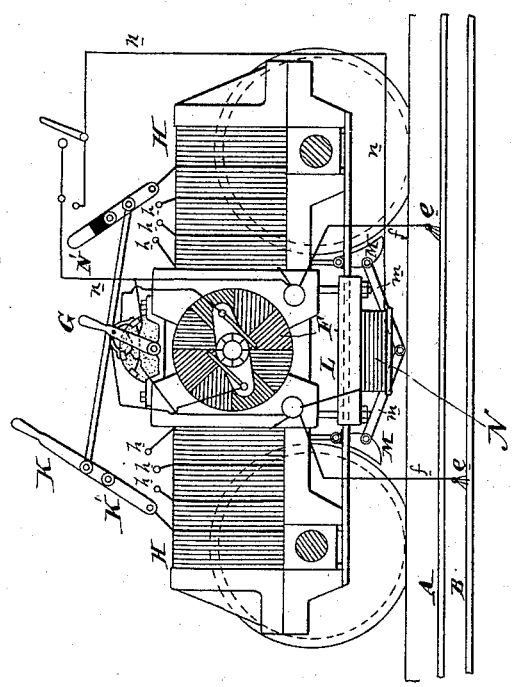
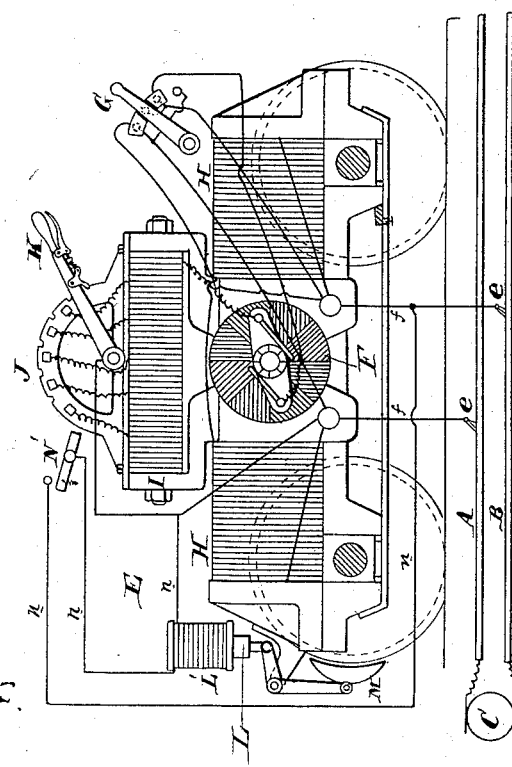
Attest:
Inventor:

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 385,672, dated July 3, 1888.

Original application filed March 18, 1886, Serial No. 195,742. Divided and this application filed January 16, 1888. Serial No. 260,798. (No model.)

*To all whom it may concern:*

Be it known that I, RUDOLPH M. HUNTER, of the city and county of Philadelphia, and State of Pennsylvania, have invented an Improvement in Electric Railways, of which the following is a specification.

My invention has reference to electric railways, and relates to an improved method of controlling the movement of the train or car; and it consists in certain improvements, all of which are fully set forth in the following specification, and shown in the accompanying drawings, which form part thereof.

The object of my invention is to provide a method of braking the electric motor, and consists in increasing the counter electro-motive force of the motor until it increases above the initial electro-motive force, whereby the motor is converted into a generator or dynamo-electric machine and is driven by the momentum of the car, and then establishing a closed circuit from the source of electric supply for the motor, energizing a friction-brake to quickly stop the train. As the speed of the motor slows down, the strength of the field-magnets may be increased to maintain the counter electro-motive force above the initial electro-motive force of the source of supply.

It is immaterial to my invention what the source of electrical supply may be, as line-conductors or batteries may be employed, as desired.

This system of braking a car or train would be particularly useful when it is desired to stop the car or train exactly in front of the station or platform.

The counter-electro-motive-force braking system is particularly available in slowing down the train, leaving it to the friction-brake to finally stop the train.

It will be observed that the motor when braking the train acts as a generator and supplies electricity to the line-conductors, and this is particularly advantageous, as the extra duty required in going upgrade is practically compensated for in going downgrade, as the extra current utilized is returned to the conductors again and aids the other trains in ascending the grade.

This is a division of my application, Serial No. 195,742, filed March 18, 1886.

In the drawings, Figures 1 and 2 are sectional elevations of electric motors on a railway and in connection with the working-conductors and embody apparatus for carrying out my method of braking.

A and B are the line-conductors, and, if desired, may be used as working-conductors also.

C is the generator.

E are the motors, and are electrically connected to the working-conductors by wires $f$ and brushes $e$. The armatures F of the motors are in multiple-arc connection with the field-magnets H, and the currents in the armatures may be reversed by switches G. The field-magnets H (see Fig. 2) may be wound in separate coils, or the coils may be tapped, as at $h$, and switches K', operated by handle K, may be used to vary the power of the field-magnets by increasing or decreasing the number of coils in circuit on the cores.

In place of changing the power of the field-magnets, as above described, one or more separate or regulating generator-magnets, I, (see Fig. 1,) may be connected with the poles or cores of the field-magnets, and may be traversed by a separate current than that passing through the field, and its magnetic strength may be varied by a switch-lever, K, working with the contacts J in circuit with various portions of the magnets I, so that any desired portion of the coils may be cut out to decrease the strength of the field, or vice versa. By this means it is seen that if it is desired to stop the train the driver has simply to operate the lever K, increasing the counter electro-motive force until it equals the initial electro-motive force. Then the motor will neither act as a motor nor as a dynamo; but now as the field of force is increased the counter electro-motive force becomes the stronger, and the motor acts as a brake.

L is a friction-brake armature, and may be attracted by the motor-magnets or by auxiliary magnets, if desired, and may be made as a core to work in a helix, as shown at L'. This armature L is connected with the toggle-joint $m$, adapted to actuate the brake-shoes M. To make this brake more powerful, I provide the armature with a helix, N, in shunt-circuit $n$ with the motor, and a switch, N', may be used to open or close the circuit $n$ when the brake is to be taken off or put on. When the motor is normally running, the armature L is out of magnetic attraction sufficient to put on the brake; but if the circuit $n$ be closed it will then be attracted to put on the friction-brake. Again, if the motor is being braked by the counter electro-motive force, the increase of the field will automatically put on the friction-brakes if the increase in the field of force is such as to insure the attraction of the armature L.

It is evident that the brake-armature L may be so designed that with the greatest increase of the field of the motor (by increase of the counter electro-motive force) the attraction may be such that the instant the circuit $n$ is closed the armature L, becoming magnetized, instantly applies the friction brake to stop the train after the counter electro-motive force has acted to slow it down, thereby enabling the train to be stopped exactly at the right place.

The switch N' may be made to operate by the lever K after it has been moved to put on the greatest counter electro-motive force.

Any matters herein set out but not claimed are not dedicated to the public, but form subject-matter of other applications. For instance, the broad invention of braking a train by the employment of the increasing counter electro-motive force is not here claimed and forms subject-matter of my application No. 195,742, of 1886, and neither is the apparatus claimed in this application, as that forms subject-matter of the above application and my applications No. 248,102, of 1887, and No. 200,400, of 1886.

Having now described my invention, what I claim as new, and desire to secure by Letters Patent, is—

1. The method of braking an electrically-propelled vehicle, which consists in first slowing down the vehicle by increasing the counter electro-motive force of the motor until it increases above the initial electro-motive force of the source of electric supply, and simultaneously therewith establishing a closed circuit from the source of electric supply for the motor, energizing a friction-brake to quickly stop the vehicle at the desired position.

2. The method of braking an electrically-propelled vehicle, which consists in first increasing the strength of the field-magnets of the motor until the counter electro-motive force of the motor increases above the initial electro-motive force of the electric supply, and simultaneously therewith establishing a closed circuit from the source of electric supply for the motor, energizing a friction-brake to quickly stop the vehicle.

3. The method of braking an electrically-propelled vehicle, which consists in increasing the counter electro-motive force of the motor above the initial electro-motive force of the source of electric supply for the motor, and simultaneously therewith increasing the magnetism of an electro-magnetic friction-brake by means of the current from the same source as the motor until it is energized sufficiently to be automatically applied simultaneously with and in conjunction with the counter electro-motive force to quickly stop the train.

4. The method of braking an electrically-propelled vehicle, which consists in increasing the counter electro-motive force of the motor above the initial electro-motive force of the source of electric supply, and as the speed of the motor decreases increasing the strength of the field-magnets of the motor to maintain the counter electro-motive force above the initial electro-motive force of the source of electric supply, and simultaneously therewith establishing a closed circuit from the source of electric supply for the motor, energizing a friction-brake to quickly stop the vehicle at the desired position.

In testimony of which invention I hereunto set my hand.

RUDOLPH M. HUNTER.

Witnesses:
 RICHD. S. CHILD, Jr.,
 ERNEST HOWARD HUNTER.